Jan. 23, 1934.  V. G. APPLE  1,944,205
CONTROL MECHANISM
Filed Jan. 23, 1930   3 Sheets-Sheet 3
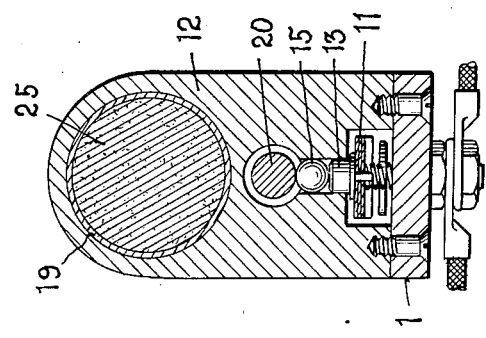
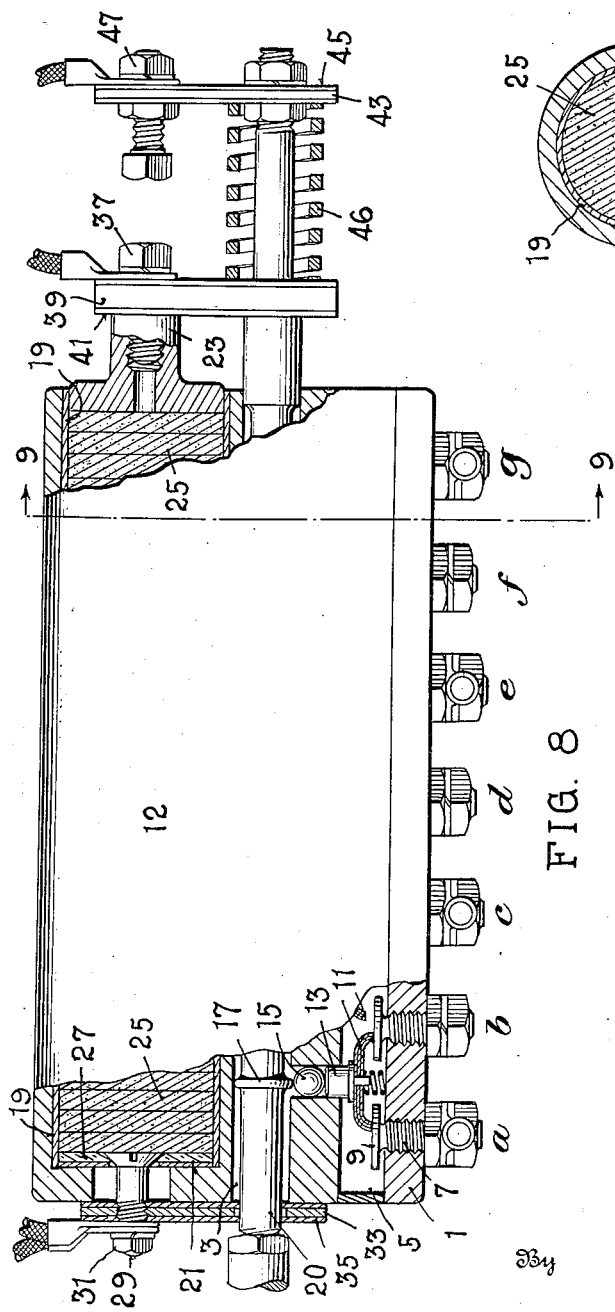
Inventor
VINCENT G. APPLE, Jan. 23, 1934.  V. G. APPLE  1,944,205
CONTROL MECHANISM
Filed Jan. 23, 1930   3 Sheets-Sheet 1
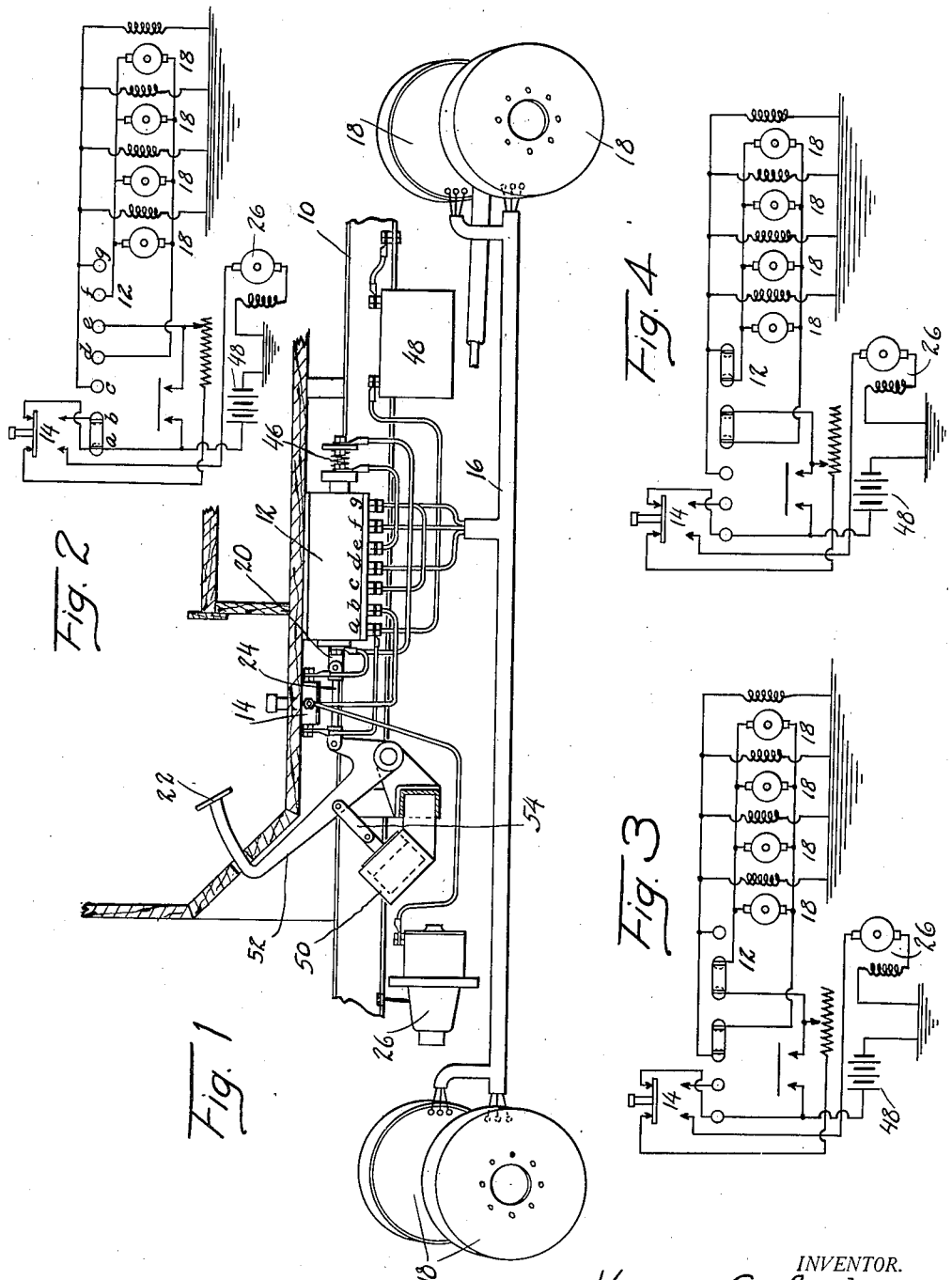
INVENTOR.
Vincent G. Apple
BY
Burton & McConkey
ATTORNEYS

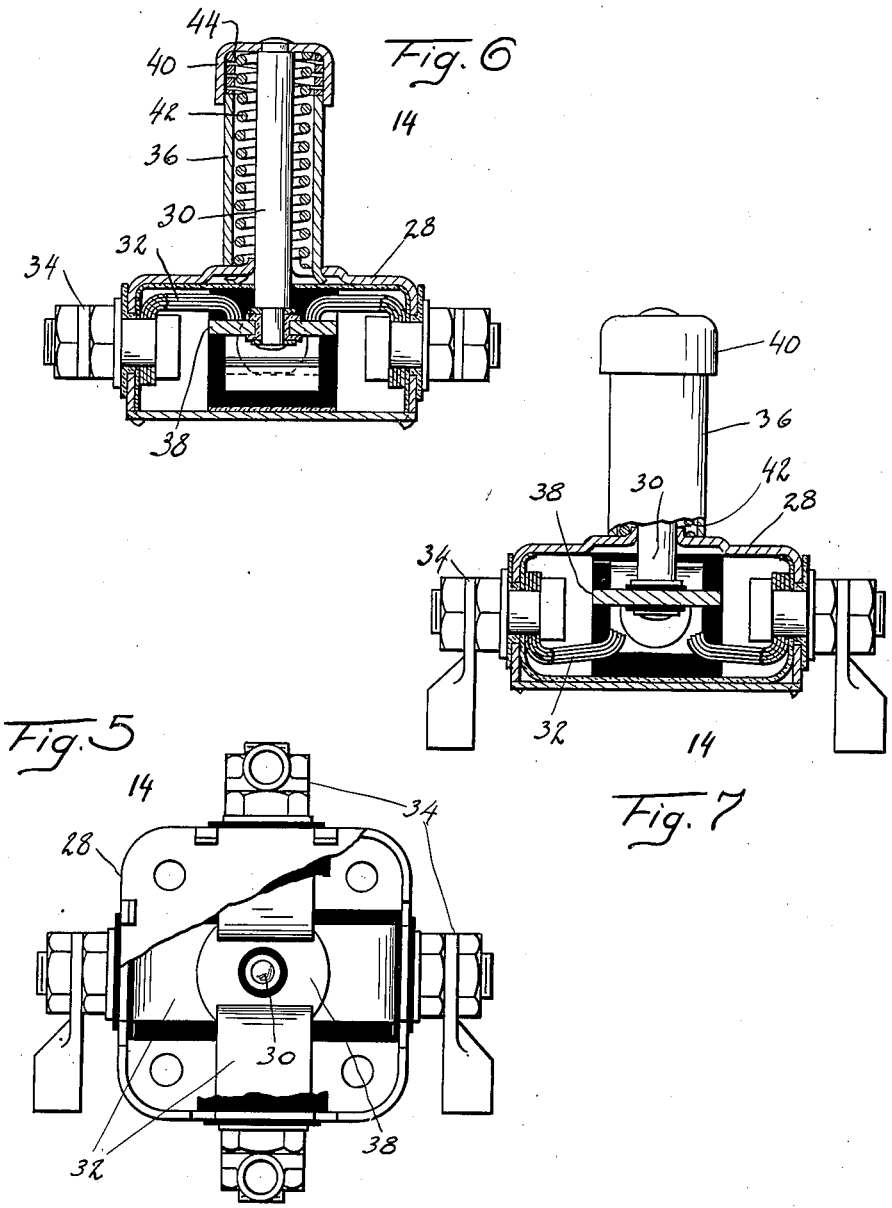

Patented Jan. 23, 1934

1,944,205

UNITED STATES PATENT OFFICE 1,944,205

CONTROL MECHANISM

Vincent G. Apple, Dayton, Ohio, assignor to Bendix Brake Company, South Bend, Ind., a corporation of Illinois Application January 23, 1930. Serial No. 422,750

2 Claims. (Cl. 188—162)

My invention relates to vehicle control mechanism and has particular reference to a control for a system where a single source of power is utilized to operate the vehicle brakes and to crank the engine.

An object of my invention is to incorporate with a control system somewhat similar to that disclosed in my copending application Serial Number 422,748, filed January 23, 1930, an interlocking means whereby the brakes may be locked in any desired position, without in any way interfering with the operation of the other controls.

Another object of my invention is to provide control mechanism for the brakes and engine starting means which is as nearly as possible automatic and foolproof in its operation.

A feature of importance is the provision of an improved starter control switch located in an electric control system and operable to make either of two circuits, depending upon the character of its actuation, said circuits determining the operation of independent control devices for the vehicle.

Various other objects and meritorious features of my invention will become apparent from the following description taken in conjunction with the drawings wherein like numerals refer to like parts throughout the several figures and wherein:

Fig. 1 is a schematic diagram of my control system,

Figs. 2, 3, and 4 are circuit diagrams of the electrical connections utilized,

Figs. 5, 6, and 7 are sectional views of my four pole double throw switch,

Fig. 8 is a side elevation of my controller unit, partially broken away and in section, and Fig. 9 is a vertical section on the line 9—9 of Fig. 8.

The numeral 10 in the schematic illustration of Fig. 1 indicates the frame of the conventional automotive chassis. A controller member 12, to be described more fully hereinafter, but of the general type illustrated in my copending application Ser. No. 421,328, filed January 16, 1930, is secured in any convenient manner to the chassis frame. The starting switch 14, which is disclosed in detail in Figs. 5 to 7, is likewise secured in a convenient fashion to the chassis frame. Electrical connections are led through any convenient type of conduit 16 from the controller 12 to an electric power device secured within each of the brake drum assemblies 18. While I have illustrated no particular type of electric brake applying unit, I contemplate the use of reversible electric motors having a threaded armature shaft which functions to force a camming arm in one direction or another according to its direction of rotation, thereby positively applying or releasing the brakes. While I have illustrated this feature only broadly in this application, reference to my copending application Serial Number 404,241, filed October 18, 1929, will afford a complete disclosure and description of same.

The axially slidable camming rod 20 of the controller 12 is moved on depression of the brake pedal 22 by means of the link 24. One pair of contacts of my double throw switch 14 is connected up to the controller as indicated, and the other to the controller and to the electric starting motor 26.

This double throw four pole switch 14 is illustrated in detail in Figs. 5 to 7. It comprises a casing member 28 having an opening in the top thereof which permits axial sliding movement of the pin 30. Secured to each of the four sides of the casing member 28 are contact plates 32 which are properly insulated from the casing itself, and each of these is provided with outside terminal facilities 34. A tubular closure member 36 is secured to the top of the casing 28 and encloses the pin 30. Secured to the inner extremity of this pin 30 and insulated therefrom is the conducting bridge plate 38.

It is to be noted from Figs. 6 and 7 that two of the contact plates 32 are located in horizontal alignment toward the top of the casing while the other two contact members (Fig. 7) are in horizontal alignment toward the bottom of the casing.

A cap member 40 is secured in an annular seat at the outer extremity of pin 30 and designed to telescope about the casing 36 when downward pressure is applied thereto. A coil spring 42 surrounds the pin 30 within the casing 36, having its bottom seated on the top of casing 28 and bearing on the underside of cap member 40 at its upper extremity. In this way the spring 42 tends to normally retain the conducting bridge plate 38 in its uppermost position where it bridges the two upper contact plates of my four pole switch.

A second coil spring 44 is seated between the top edge of the casing 36 and the underside of the cap 40. This second spring 44 is a great deal stiffer than the spring 42 and the result is that when certain predetermined normal pressure is applied to the top of the cap 40 the stem 30 is depressed only slightly against the counteracting resistance of the stiff spring 44. In this way the conducting bridge plate 38 is normally forced into a position midway between my upper and lower pair of contact plates 32.

When still greater pressure is applied to the top of the cap 40, that is to say, a pressure which must be the result of the operator's preconceived design to force the switch cap into its lowermost position and cannot be the result of accident, the contact bridge member is depressed to the point where it bridges the lowermost pair of contact plates 32. This is for the purpose of precluding accidental bridging of the lowermost contact plates which, as will be described hereafter, closes the circuit from the power source or storage battery through the electric starting motor 26.

The controller unit 12 comprises a casing 1 provided with an axial passageway 3 through which the cam rod 20 is adapted to slide. The lower portion of the casing is provided with a longitudinally extending recess 5 which functions as a compartment within which the various switch blades utilized in the controller are located.

Positioned along the base of the casing in longitudinally spaced relation are a series of terminal contact members indicated as $a$, $b$, $c$, $d$, $e$, $f$, and $g$. Each terminal member is secured to the casing by means of a threaded bolt 7 on the inner extremity of which is positioned a contact plate 9. A series of passages extend between the passageway 3 and the compartment 5, each passage being located substantially midway between two adjacent contacts 9. Switch blades 11 operate to bridge adjacent pairs of contact plates 9, each switch blade having positioned thereon a plug 13 which extends up into one of the connecting passages. Ball members 15 are seated upon opposite sides of these plugs.

The cam rod 20 is provided at spaced intervals along its length with camming surfaces 17 which, as the said cam rod is pulled axially through the casing, function to depress the balls 15, thus bridging various pairs of contact plates 9 in succession. The circuits created by the bridging of these contacts are clearly indicated in the circuit diagrams, Figs. 2 to 4, inclusive.

The upper portion of the casing includes a tubular compartment lined with insulating material 19 along its side walls and provided with an apertured plate of insulation material 21 at one end. The other end of the compartment is closed by means of a contact plug 23 which operates to compress the carbon discs 25 positioned within the tube. A metallic contact plate 27 is positioned at the base of the carbon pile and is provided with a contact plug 29 to the free end of which is secured by means of the nut 31 a metallic plate 33 insulated on each side by insulation plates 35.

The plug 23 is recessed to receive a threaded terminal contact 37 which functions to retain a metallic plate 39 in position. This plate is apertured to permit the cam shaft 20 to slide therethrough and is insulated on each side by means of plates 41.

At the rear extremity of the cam shaft 20 is positioned a metallic plate 43, insulated on each side by plates 45. A terminal contact broadly indicated at 47 is provided adjacent the edge of said plate and a coil spring 46 is seated at one extremity against insulation plate 45 and at the other against insulation plate 43. It will therefore be apparent that axial movement of the cam shaft must be against the resistance of this coil spring and that, as the limit of such axial movement is reached, the terminal contact 47 will engage the terminal 37 to short-circuit the resistance offered by the carbon pile.

In its normal, or inoperative, position the contacts in controller 12 are so bridged that when the starter switch 14 is in its normal, or uppermost, position and the brake pedal 22 is slightly depressed there will be a circuit from the battery 48 through the various resistances in my controller to the brakes, said circuit being grounded at one end from the battery to the frame of the car and from the electric motors in the brake assemblies 18 through the axle. On this first slight depression of the brake pedal 22 the circuit will be in a direction which will rotate the electric brake motor shafts to release the brakes. However, upon further depression of the brake pedal 22 the switch contacts within the controller 12 are shifted, reversing the circuit through the electric motor brakes and thereby applying the brakes.

The electrical connections between the battery 48, controller 12, switch 14, etc., are clearly illustrated in Figs. 1 to 4, inclusive, of the drawings. The manner in which axial movement of the cam shaft 20 on depression of the brake pedal 22 reverses the circuit to apply and release the brakes is clearly illustrated in Figs. 3 and 4, Fig. 2 representing the circuit established when the brake pedal 22 is in its totally released position. At that point the terminal contacts $a$ and $b$ of the controller will be bridged, as indicated in Fig. 8, and upon depression of the starter button of switch 14, a circuit through the electric starting motor 26 will be completed. It will be obvious that as depression of brake pedal 22 pulls the cam shaft 20 axially through the controller 12 the carbon discs will be compressed more and more by means of the plug 23, thereby decreasing the resistance in the brake circuit. On final depression of the pedal 22 the resistance is entirely cut out by being shortcircuited and the full power from the battery 48 is transmitted to the brake motors.

A dashpot 50, the piston of which is pivotally connected to the brake pedal stem 52 by means of the link 54, controls the rebound of the brake pedal 22. This dashpot is so designed that it functions to catch the brake pedal on its release just at that point where the circuit through the electric brake motors is reversed by the position of the cam rod 20. From this position where it is caught by the dashpot the brake pedal 22 returns to its normal position at a predetermined speed, in this way regulating the period during which the brake motors operate to positively release the brakes.

A predetermined pressure on the electric switch button 14, when the pedal 22 is in released position, closes a circuit through the electric starting motor 26 by bridging the lowermost pair of contact plates 32 in the switch member.

Slight pressure on the switch pedal 14 at any time when the brake pedal 22 is depressed to apply the brakes will break the circuit through the electric brake motors, thus locking the brakes in any desired position. It is only by decidedly greater pressure upon this switch pedal 14 that the electric starting motor circuit is closed.

It is obvious that the brakes may be permanently locked in any desired position by releasing the foot pedal 22 prior to releasing the starting switch 14, after the said starting switch has been slightly depressed to break the electric motor circuit.

This is because release of the brake pedal 22 brings the contacts in the controller member 12 in a position where the circuit through the electric brake motors is broken, and they are in position to complete the circuit from the battery to the electric starting motor in depression of the starter pedal 14 to its lowermost position, where the lowermost pair of contact plates 32 will be bridged. Thus it is obvious that releasing the starter pedal 14 when the controller switches are so positioned leaves the circuit open in every respect.

Having illustrated a preferred embodiment of my invention various other modifications will be apparent to those skilled in the art and I intend to limit myself only within the scope of the appended claims.

1. Vehicle control mechanism comprising a brake, a brake pedal, a starter motor, starter pedal, a reversible electric motor adapted to actuate the brake, means for closing a circuit through the brake motor upon depression of the brake pedal, means associated with the starter pedal and cooperable therewith for automatically opening said circuit and closing one through the starting motor upon maximum depression of the starter pedal, said means being operable upon partial depression of the starter pedal to lock the brakes in any position.

2. Vehicle control mechanism comprising brakes and a brake pedal, electric power means operable to apply said brakes upon normal depression of the pedal, means automatically responsive to the full release of the pedal to positively release the brakes, a dash pot automatically controlling the period of positive release action, and means operable to lock said brakes in any desired position.

VINCENT G. APPLE.